(12) United States Patent
Tan et al.

(10) Patent No.: US 11,002,353 B2
(45) Date of Patent: May 11, 2021

(54) CYCLOIDAL PIN WHEEL HARMONIC TRANSMISSION DEVICE

(71) Applicant: SHENZHEN LLMACHINECO., LTD, Shenzhen (CN)

(72) Inventors: Jun Tan, Shenzhen (CN); Xianhong Cao, Shenzhen (CN)

(73) Assignee: SHENZHEN LLMACHINECO., LTD, Shenzhen (CN)

( * ) Notice: Subject to any disclaimer, the term of this patent is extended or adjusted under 35 U.S.C. 154(b) by 309 days.

(21) Appl. No.: 16/138,701

(22) Filed: Sep. 21, 2018

(65) Prior Publication Data

US 2019/0093747 A1    Mar. 28, 2019

(30) Foreign Application Priority Data

Sep. 28, 2017  (CN) .......................... 201710896862.0

(51) Int. Cl.
| | |
|---|---|
| *F16H 1/32* | (2006.01) |
| *F16H 49/00* | (2006.01) |
| *F16H 57/00* | (2012.01) |
| *F01L 1/352* | (2006.01) |

(52) U.S. Cl.
CPC .......... *F16H 49/001* (2013.01); *F16H 57/00* (2013.01); *F01L 2001/3521* (2013.01); *F16H 2057/0087* (2013.01)

(58) Field of Classification Search
CPC ................ F16H 49/001; F16H 2057/0087
USPC .............................................. 74/640
See application file for complete search history.

(56) References Cited

U.S. PATENT DOCUMENTS

| | | | | |
|---|---|---|---|---|
| 5,497,041 A | * | 3/1996 | Kondoh | H02K 3/26 |
| | | | | 310/82 |
| 2014/0047938 A1 | * | 2/2014 | Horiuchi | F16H 49/001 |
| | | | | 74/412 R |
| 2015/0285357 A1 | * | 10/2015 | Orii | F16H 49/001 |
| | | | | 74/640 |
| 2016/0245386 A1 | * | 8/2016 | Rossberger | F16H 49/001 |

FOREIGN PATENT DOCUMENTS

| | | | |
|---|---|---|---|
| JP | 63-130949 | * | 6/1988 |
| JP | 06-66350 | * | 3/1994 |
| JP | 09-303496 | * | 11/1997 |

\* cited by examiner

*Primary Examiner* — William C Joyce

(57) ABSTRACT

A cycloidal pin wheel harmonic transmission device includes camshaft, flexible bearing, flexible wheel, roller pins and rigid wheel. The flexible bearing is mounted on the camshaft with elliptical shape. The flexible wheel has inner ring cooperated with outer ring of the flexible bearing, and outer teeth surface contacted with each roller pin. The roller pins are evenly disposed inside semicircular groove of the rigid wheel. The flexible wheel is fixedly connected with inner ring and the rigid wheel is fixedly connected with outer ring of the main bearing. Both teeth height and root have cycloidal teeth profiles reduces the risk of breakage failure, possible to obtain larger engagement without deep engaging distance. Teeth width is large, used for the engagement, the surface specific pressure is small. It is possible to withstand large torque to reduce the amount of deformation of the flexible wheel, and to greatly improve the longevity.

5 Claims, 3 Drawing Sheets

CYCLOIDAL PIN WHEEL HARMONIC TRANSMISSION DEVICE

TECHNICAL FIELD

The invention relates to the field of precision reducer, and particularly, to a cycloidal pin wheel harmonic transmission device.

BACKGROUND

In fields of industrial robot and various precision machines, precision reducer is an important component. In these fields, the reducer is required to have the characteristics of small size, light weight, high rigidity, overload resistance and smoothness, as well as to have large speed ratio, small clearance, small angle transmission error and good acceleration performance.

K-H-V(N) type involute planetary transmission is a structure with less teeth difference. A pair of planetary gears is mounted on the two eccentric journals of the input shaft with difference of 180°. Two planetary gears are engaged with a same internal gear, which has a same teeth difference as those of the planetary gears. If the internal gear is fixed, the planetary gear itself will also rotate at a certain angle, along with the revolution of the planetary gear. The rotation angle of the planetary gear itself is determined by the number of the teeth difference. The planetary gear performs both revolution and rotation movement, and because of the complex movement, it is needed to offset the revolution through the output mechanism and only output the rotation by the differential movement. Compared with the reducer with conventional structure, the K-H-V(N) type involute planetary reducer with less teeth difference has a large transmission ratio, a compact structure, a light weight and good acceleration performance. The first stage gear ratio may be up to i=100. Compared with the cylindrical gear reducer with the same transmission ratio and the same power, the quality may be significantly reduced.

The harmonic transmission is a transmission which applies flexible involute gear with a controllable elastic deformation, a rigid internal gear and an elliptical wave generator as main mechanical structures. There is a difference in the teeth number between the flexible gear and the rigid internal gear, and thus the harmonic wave transmission is also regarded as a differential transmission. The principle of the harmonic transmission may also be understood as K-H-V (N) type involute planetary transmission with less teeth difference, the flexible gear may be understood as the fusion deformation of two planetary gears, the wave generator may be understood as a variant of the eccentric shaft, while the housing of the flexible wheel functions as a output mechanism of K-H-V(N) type involute planetary transmission with less teeth difference. Therefore, in essence, the harmonic transmission is also a K-H-V (N) type involute planetary transmission with less teeth difference. This invention seeks to improve the structure of the K-H-V(N) type involute planetary transmission with less teeth difference, so as to achieve a simpler structure, a more compact volume and a lighter weight.

The involute planetary transmission with less teeth difference and the harmonic transmission have the following disadvantages that, when the difference in the teeth numbers is too small, there may be an overlap interference of the teeth profile and an interference of the teeth top at the other end of the joint, which needs to be solved by reducing the teeth height and increasing the pressure angle. However, the problem still cannot be solved fundamentally.

With respect to the cycloidal pin wheel planetary transmission, the teeth profile of the K-H-V(N) type involute planetary transmission with less teeth difference is completely changed, and the involute internal gear and the involute planetary gear are replaced as the pin wheel and the cycloidal wheel. Due to the unique relationship among the formation principle of the cycloidal gear profile, the diameters of the roller pins and the radius of the eccentric movement, the cycloidal pin wheel planetary transmission with one teeth differential theoretically has the roller pins simultaneously engaged, though a half number of teeth thereof, with the cycloidal wheel. All roller pins are in contact with the cycloidal wheel at the same time. This teethed engaging transmission completely solves the problem of overlapping interference of teeth profile and the interference of the teeth top at the other end of the joint of the involute planetary transmission with less teeth difference. Also, the transmission precision and the rigidity of the mechanism are significantly improved, and the noise is reduced.

At present, a transmission form of harmonic transmission in which applies cycloidal pin wheels engagement has yet not been found. Based on the above background, the present invention proposes a cycloidal pin wheel harmonic transmission. In the involute teethed harmonic transmission, the difference between the lengths of the long axis and the short axis of the wave generator of the harmonic transmission needs to be as large as possible, in order to avoid the overlapping interference of teeth profile and the interference of the teeth top at the other end of the joint; while the flexible wheel and the material properties of the bearing require that the difference between the lengths of the long axis and the short axis of the wave generator needs to be as small as possible. This contradiction makes the harmonic reducer sacrifice rigidity and impact resistance in the design. The present invention may improve the above contradiction problem, and simultaneously improve the coincidence of the engaging and increase the rigidity.

SUMMARY

The technical problem to be solved by the present invention is to provide a cycloidal pin wheel harmonic transmission device, which may effectively solve the deficiencies in the prior art.

The invention is realized by the following technical solutions. A cycloidal pin wheel harmonic transmission device comprises a camshaft, a flexible bearing, a flexible wheel, roller pins and a rigid wheel. The flexible bearing is mounted on the camshaft with a an elliptical shape. The flexible wheel has an inner ring cooperated with an outer ring of the flexible bearing, and an outer teeth surface contacted with each of the roller pins. The roller pins are evenly disposed inside an semicircular groove of the rigid wheel. The flexible wheel is fixedly connected with an inner ring of a main bearing, and the rigid wheel is fixedly connected with an outer ring of the main bearing.

As a preferred technical solution, the camshaft is closely fitted together with an inner ring of the flexible bearing, so as to form a wave generator; and the inner ring of the flexible wheel is closely fitted together with the outer ring of the flexible bearing.

As a preferred technical solution, the roller pins are circumferentially and evenly disposed inside the semicircular groove of the rigid wheel, and the semicircular groove of the rigid wheel is constructed to have a rib, whose inner diameter is not less than the diameter of a circle along which the roller pins are distributed.

As a preferred technical solution, the flexible wheel is constructed to have a cup-shape; a bottom of the flexible wheel is designed as a through hole, and the inner ring of the main bearing is provide with a threaded hole corresponding to the through hole of the flexible wheel, so as to be fixedly connected with it by using a screw; the rigid wheel has an outer ring provided with a threaded hole, and the outer ring of the main bearing is provide with a through hole corresponding to the threaded hole of the rigid wheel, so as to be fixedly connected with it also by using a screw; and the main bearing is preferably a crossed roller bearing.

The cycloidal wheel is fixed, and the roller pins move relative to the cycloidal wheel in a certain regularity. The movement regularity is determined by the mechanism and transmission ratio of the reducer, and the roller pins continuously move according to a given movement regularity along the periphery of the cycloidal wheel. On the outer circle of the roller pins, a continuous closed envelope is formed on the periphery of the cycloidal wheel. In other word, this envelope is the teeth profile curve of the cycloidal wheel.

The cycloid design is defined by the following parameters of: the radius R of the reference circle along which the center of the roller pins are disposed on the pin gear shell, the number Z of the roller pin, the radius R of the roller pin, and the eccentricity E of the planetary movement. Taking the center of the cycloidal wheel as the coordinate origin, the center coordinate (x, y) of the roller pins with respect to time t satisfies the following parameter equations:

$$x=E*\text{Cos}(Z*t)+R*\text{Cos}(t)$$

$$y=E*\text{Sin}(Z*t)+R*\text{Sin}(t)$$

The cycloidal pin wheel planetary transmission with one-teeth difference, designed according to the above method and parameters, has the following characteristics. During the transmission process, all the outer circles of the roller pins are tangent to the teeth profile curve of the cycloidal wheel at all times. The profile curve of the entire cycloidal wheel is continuous and may be derivable everywhere. The coincidence degree is 50% during the process of the engaging transmission. There is no teeth top interference and teeth profile overlapping interference. The teeth height is 2 times of the eccentricity. The number of teeth of the cycloidal wheel is Z−1.

The above-mentioned features bring in the following benefits. A smooth transmission process is obtained. Also, there is no alternating impact of the engaging teeth during the transmission process. Further, a large degree of coincidence is obtained.

The flexible wheel of the cycloidal pin wheel harmonic transmission according to the present invention has a standard circular flexible wheel before being assembled, and is deformed into an elliptical shape after being assembled as constrained by its adjacent parts.

The specific design process of the flexible wheel teeth profile curve and the wave generator will be described below in detail.

An envelope method is applied as the design method of the flexible wheel cycloid teeth profile curve. The flexible wheel cycloid teeth profile curve is formed by a same principle, as those of the cycloidal wheel teeth profile curve of the cycloidal pin wheel planetary transmission with one teeth difference described above.

The design parameters of the flexible wheel cycloid are respectively the radius R of the reference circle disposed on the rigid wheel by the roller pin center, the number Z of the roller pins, the radius R of the roller pins, and the eccentricity E of the planetary movement. Taking the center of the flexible wheel as the coordinate origin, the center coordinate (x, y) of the roller pins with respect to time t satisfies the following parameter equations:

$$x=E*\text{Cos}(t*(Z-1))+(R-E)*\text{Cos}(t)$$

$$y=E*\text{Sin}(t*(Z-1))+(R+E)*\text{Sin}(t)$$

The parametric equations described above are obtained, in an instantaneous state after the deformation of the flexible wheel, which is also a state in which the actual deformation of the flexible wheel is approximated.

The design parameters of the flexible wheel curve are obtained by using the above method. Then the teeth profile curve of the circular flexible wheel is obtained according to the design method of the cycloidal wheel of the cycloidal pin wheel planetary transmission with one teeth difference as described above. The circular flexible wheel teeth profile curve has the feasibility of processing. The actual working state of the flexible wheel is the deformation state constrained by the adjacent parts.

The profile curve of the camshaft 101 is a closed elliptic curve, and the difference between the major axis radius b and the minor axis radius a is twice of the eccentricity. The specific size of the ellipse is determined by the inner diameter d of the selected thin-walled bearing. The parametric equations of the elliptical curve are defined as follows.

$$x=a*\cos(t)$$

$$y=b*\sin(t)$$

The circumference of the ellipse is calculated by computer integration, and then the diameter of the corresponding circle is calculated. The results of the calculations are compared with the inner diameter d of the selected bearing 102. By iterative iteration, exact values of a, b may be obtained. As such, the profile curve of the ellipse is determined.

The cycloidal pin wheel harmonic transmission, designed by using the above method and parameters, has the following characteristics. During the transmission process, all the outer circles of roller pins are tangent to the teeth profile curve of the flexible wheel at all times. The profile curve of the entire flexible wheel is continuous and may be derivable everywhere. The coincidence degree is 50%, during the process of the engaging transmission. There is no teeth top interference and teeth profile overlapping interference. The teeth height is 2 times of the eccentricity. The number of teeth of the flexible wheel is Z−2. Therefore, the harmonic transmission according to the present invention is a differential transmission with 2-teeth differential.

The above-mentioned features bring in the following advantages, compared with the harmonic transmission with a conventional teeth-shape. To be specific, the cycloidal pin wheel harmonic transmission process is smooth. There is no alternating impact of the engaging teeth during the transmission process. Also, a large coincidence degree may be obtained. The difference between the long axis radius and the short axis radius of the wave generator may be significantly reduced, the length of the flexible wheel may be designed to be shorter, and the thickness of the flexible wall may be designed to be thicker. As a result, the torsional rigidity of the harmonic transmission may be improved.

BRIEF DESCRIPTION OF THE DRAWING

In order to illustrate the embodiments of the present invention or the technical solutions in the prior art more clearly, the drawings, used in the describing of the embodiments of the present invention or the description of the prior art, will be briefly explained below. The drawings, referred to in the following description, are only certain exemplary embodiments of the present invention, and it is obvious to those skilled in the art that, other drawings may be obtained from the drawings mentioned above without any creative work.

DETAILED DESCRIPTION

Figure 1:
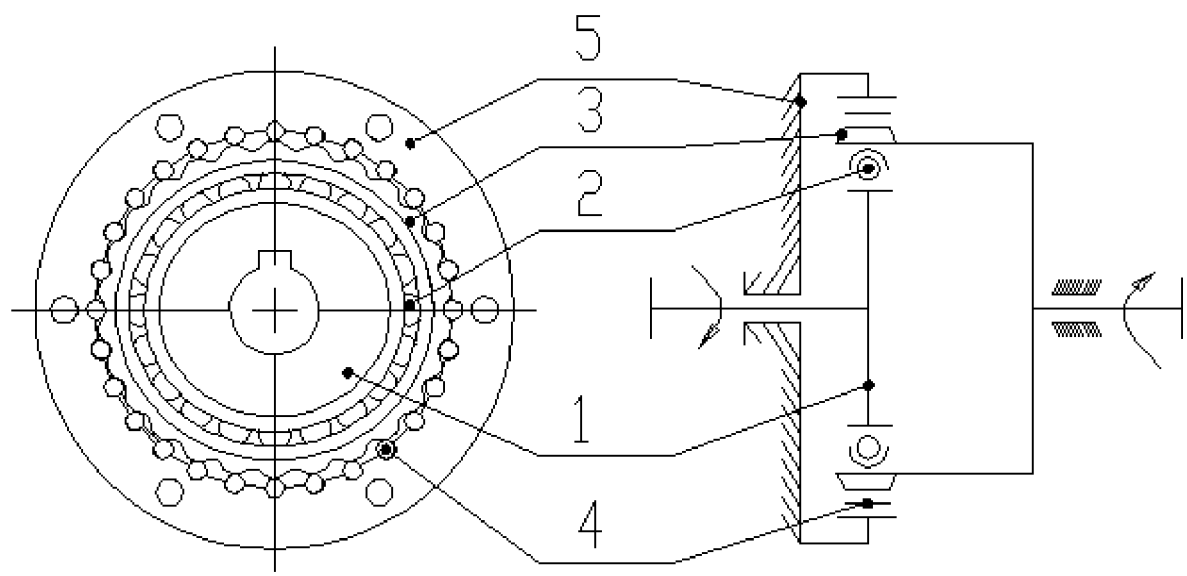
FIG. 1 is a schematic diagram showing the principle of the structure of a cycloidal pinwheel harmonic transmission.
Figure 2:
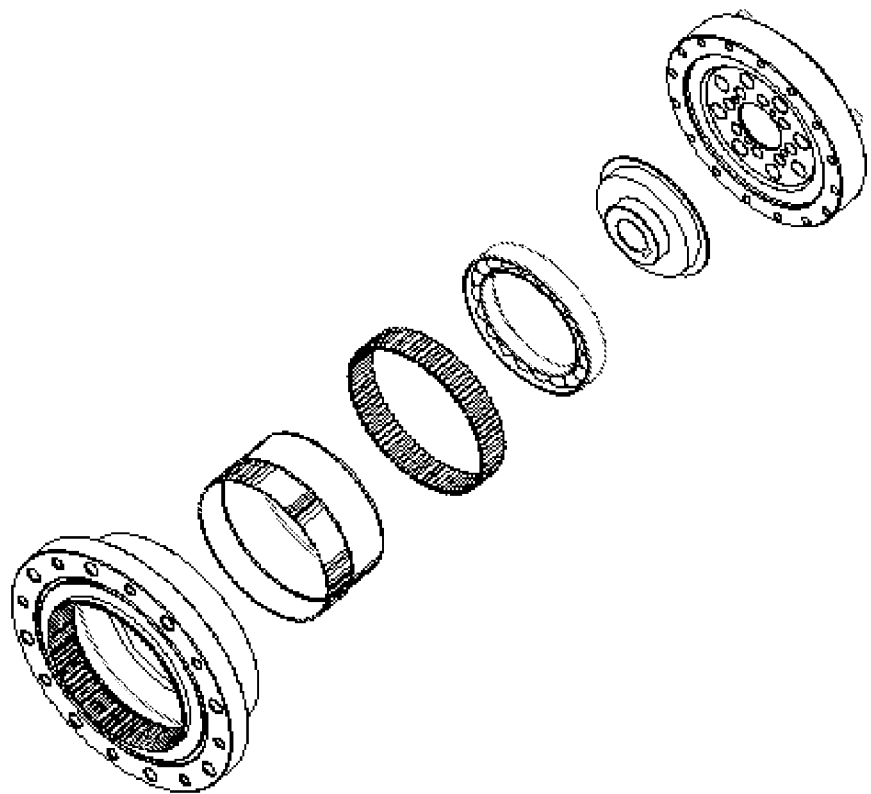
FIG. 2 is an exploded schematic diagram of the cycloidal pin wheel harmonic transmission.
Figure 3:
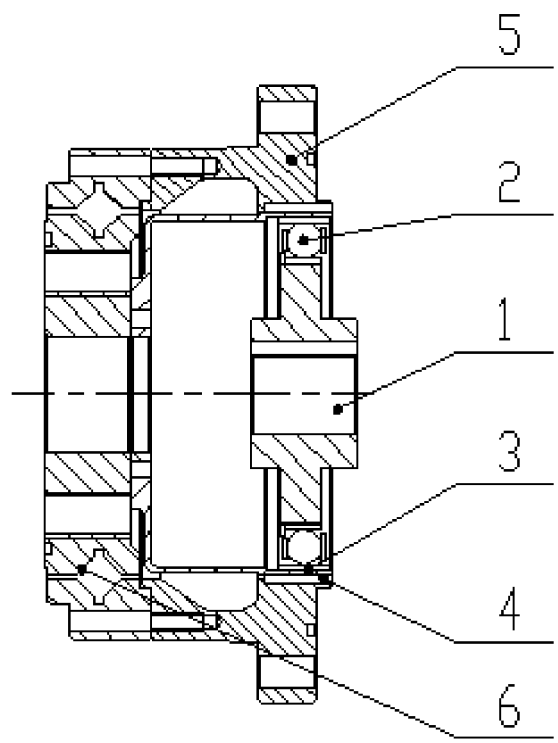
FIG. 3 is a cross-sectional view showing the structure of the cycloidal pin wheel harmonic transmission.
Figure 4:
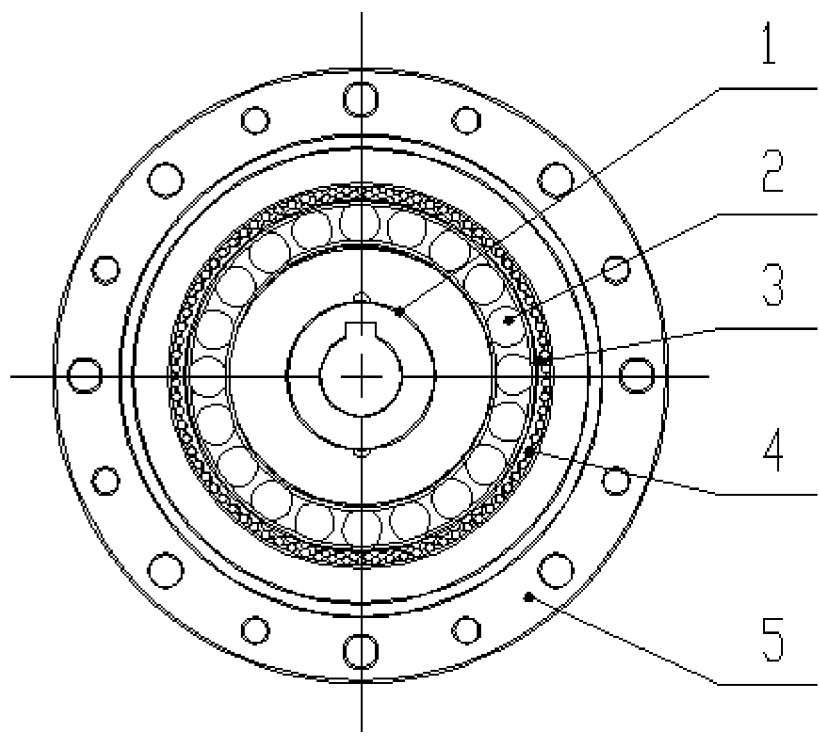
FIG. 4 is a front view of the cycloidal pinwheel harmonic transmission.

All of the features disclosed in this specification or all of the steps of methods or processes disclosed herein may be combined in any manner, except for mutually exclusive features and/or steps.

Any features, disclosed in the specification including any additional claims, abstract and drawings, may be replaced by other equivalent or alternative features which may achieve similar functions, unless specifically stated. That is to say, each of the features is only one example of a series of equivalent or similar features, unless specifically stated.

As shown in FIGS. 1 to 4, a flexible bearing 2 is mounted on a camshaft 1 with a elliptical shape. The inner ring of the flexible wheel 3 and the outer ring of the flexible bearing 2 are cooperated with each other. The outer teeth surface of flexible wheel 3 is in contact with each of the roller pins 4. The roller pins 4 is evenly disposed inside the semicircular groove of the rigid wheel 5. The inner ring of a main bearing 6 is fixedly connected with the flexible wheel 2, and the outer ring of the main bearing 6 is fixedly connected with the rigid wheel 5.

Specifically, a cam shaft 1, used in the present invention, is closely fitted together with the inner ring of the flexible bearing 2, so as to form a wave generator. The inner ring of the flexible wheel 3 is closely fitted together with the outer ring of the flexible bearing 2. Due to the outer shape of the camshaft 1, which presents an elliptical curve, theoretically, the inner ring of the flexible bearing 2, the outer ring of the flexible bearing 2, and the inner ring of the flexible wheel 3 are equidistant curves of the ellipse of the camshaft 1.

More specifically, the roller pins 4 are circumferentially and evenly disposed inside the semicircular groove of the rigid wheel 5. In order to prevent the roller pins 4 from disengaging axially, the semicircular groove of the rigid wheel 5 is needed to be designed as a structure with a rib. Also, in order to prevent the interference with the flexible wheel 2, the inner diameter of the rib should not be less than the diameter of the circle, along which the roller pins 4 are distributed.

Further, the flexible wheel 3 is a cup-shaped structure. The bottom of the flexible wheel 3 is designed with a through hole. The inner ring of the main bearing 6 is provided with a threaded hole, corresponding to the through hole of the flexible wheel 3, so as to fixedly connect the main bearing 6 with the flexible wheel 3 by using screws. The outer ring of the rigid wheel 5 is provided with a threaded hole. The outer ring of the main bearing 6 is provided with a through hole, corresponding to the threaded hole of the rigid wheel 5, so as to fixedly connect the main bearing 6 with the rigid wheel 5 by also using screws. The main bearing 6 is a cross-roller bearing, which may support both radial load and bear axial load, as well as support bending moment.

Furthermore, in theory, the design parameters of the teeth profile of the flexible wheel 3 are respectively defined as: the radius R of the reference circle, along which the centers of the roller pins 4 are disposed on the rigid wheel 5; the number Z of the roller pins 4; the radius R of the roller pins 4; and the eccentricity E of the planetary movement. Taking the center of the flexible wheel 3 as the coordinate origin, the parameter equation of the center coordinate (x, y) of the roller pins 4 with respect to the time t is as follows.

$$x = E^*\mathrm{Cos}(t^*(Z-1)) + (R-E)^*\mathrm{Cos}(t)$$

$$y = E^*\mathrm{Sin}(t^*(Z-1)) + (R+E)^*\mathrm{Sin}(t)$$

The teeth profile of the flexible wheel 3 is an equidistant curve of the center curve of the roller pins 4. The offset amount of the equidistant curve is equal to the radius of the roller pins 4, and the offset is performed in a direction toward the center. In order to make the roller pins 4 tangent to the flexible wheel 3, it is required that the eccentricity E of the planetary movement is equal to half the difference between the long semi-axis and the short semi-axle of the camshaft 1.

Furthermore, the elliptical teeth profile, mentioned above, is not convenient to process and cannot be used. In the present invention, the teeth profile of the flexible wheel 3 is obtained by the following method.

The designing equations used herein are as follows:

$$x = E^*\mathrm{Cos}(t^*(Z-1)) + R^*\mathrm{Cos}(t)$$

$$y = E^*\mathrm{Sin}(t^*(Z-1)) + R^*\mathrm{Sin}(t)$$

Wherein, the eccentricity E is equal to half of the difference between the long semi-axis and the short semi-axis of the camshaft 1; R is equal to the radius of the circle, along which the roller pins 4 are distributed; and Z is the number of the roller pins 4. If the curve is offset equidistantly toward the center, with an offset distance equal to half of the roller pins 4, the curve in a free state of flexible wheel 3 would be obtained. When the camshaft 1 is embedded into the flexible bearing 2, and when the flexible wheel 3 is embedded into the flexible bearing 2, the curve of the flexible wheel 3 is changed, because of the ellipse of the cam shaft 1. As a result, the roller pins 4 is tangent to the flexible wheel 2 at all positions.

While working, when the camshaft 1 is loaded into the flexible bearing 2, and when the flexible bearing 2 is loaded into the flexible wheel 3 in turn, the flexible wheel 3 is forced to elastically deform and appear an elliptical shape. This results in that, the root of the teeth of the flexible wheel 3 at the long axis is embedded into the roller pins 4, so as to form a state in which the root of the teeth is tangent, and in which the top of the of the teeth of the flexible wheel 3 at the short axis is also tangent to the roller pins 4. As a result, a contact holding state is maintained. When the cam shaft 1 is continuously rotated, the flexible wheel 3 is forced to constantly deform. The position, where the flexible wheel 3 and the roller pins 4 are in contact with each other, constantly changes, which results in a so-called misalignment motion and thus realizes a movement transmission.

Figure 5:
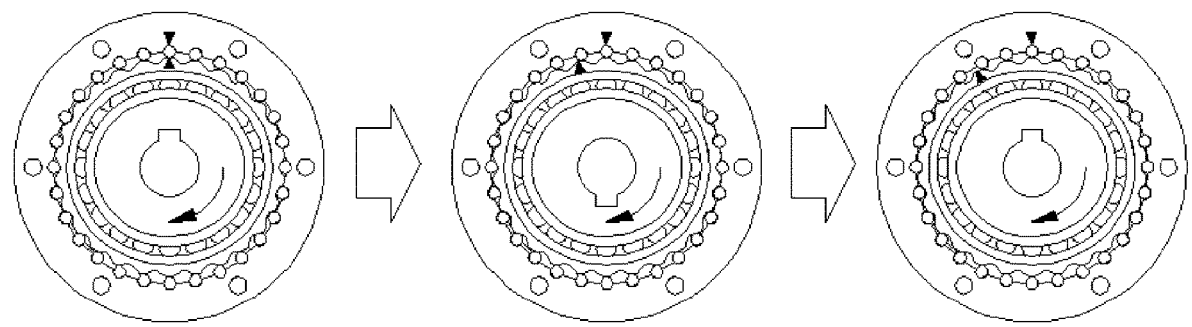
FIG. 5 is a schematic diagram showing the engaging state when the camshaft of the cycloidal pin wheel harmonic transmission rotates at a fixed angle.

Further, as shown in FIG. 5, if it is assumed that the rigid wheel 5 is fixed, when the camshaft 1 is rotated to be at 0 degree, the flexible wheel 2 and the rigid wheel 5 coincide at position indicated by the arrow. When the camshaft 1 rotates clockwise to be at 180 degree, as shown by the arrow of the flexible wheel in the figure, the flexible wheel 2 then rotates a distance equal to one tooth counterclockwise. When the camshaft 1 is rotated clockwise to be at 360 degree, as shown by the arrow of the flexible wheel in the figure, the flexible wheel 2 then rotates a distance equal to two teeth counterclockwise. Therefore, when the rigid wheel is fixed and the flexible wheel rotates, the reduction ratio is equal to half of the teeth number of the flexible wheel 2.

The camshaft 1 is shaped with an ellipse by the method of numerical control machining. The flexible wheel 2 is processed by slow wire or by using a hob. The rigid wheel 5 is processed by the method of numerically controlled milling machine, slow wire or gear shaping. It can be seen that the processes above are very simple.

The roller pins 4 are formed of the material of bearing steel, whose hardness after heat treatment may be up to HRC60-62 and roughness Ra may be up to above 0.4. It is beneficial to reduce wear and improve life.

Figure 6:
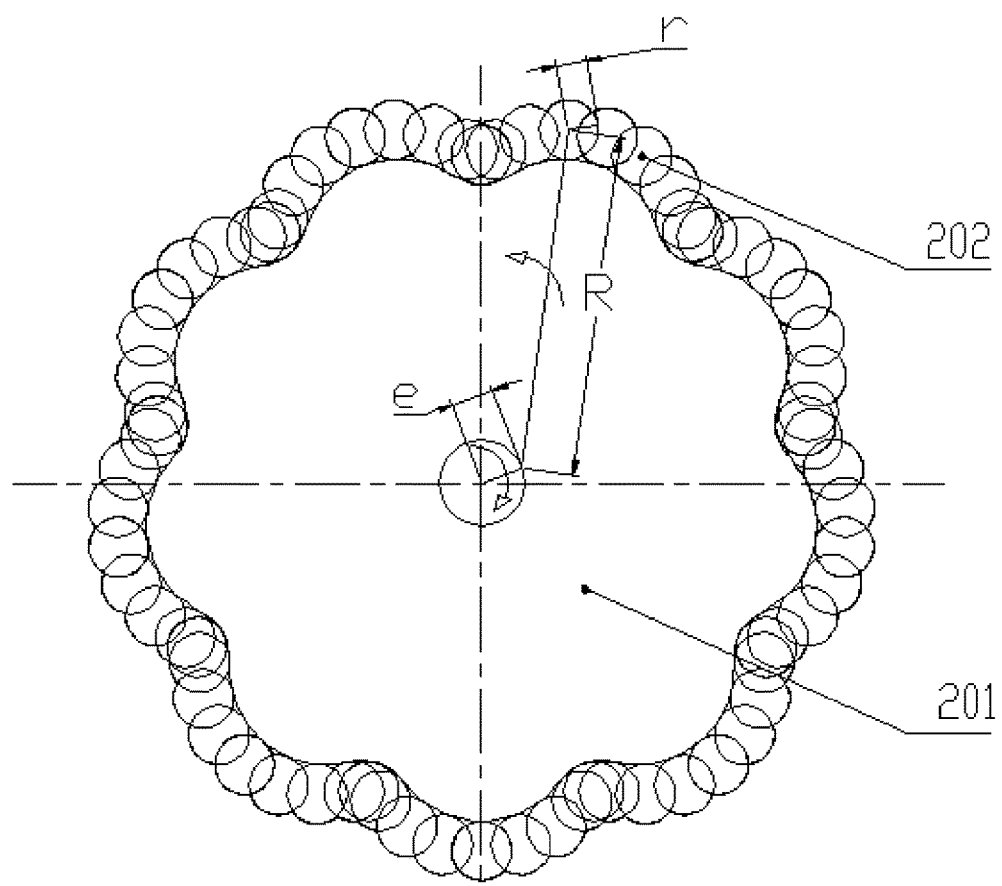
FIG. 6 is a schematic diagram showing the principle of forming the epicycloid.

As shown in FIG. 6, the cycloidal wheel 201 is fixed, while the roller pins 202 moves relative to the cycloidal wheel in particular certain regularity. The movement regularity may be determined by the mechanism and the transmission ratio of the reducer. At the periphery of the cycloidal wheel, the roller pins continuously move according to a given movement regularity. On the periphery of the cycloidal wheel, the outer circle of the roller pins forms a continuous closed envelope, and this envelope is also the teeth profile curve of the cycloidal wheel.

The above is only some particular embodiments of the present invention. The scope of the present invention is not limited thereto. Any changes or substitutions, which may be obtained by those skilled in the art without any creative effort, are included within the scope of the present invention. Therefore, the claimed scope of the invention should be defined by the appended claims.

What is claimed is:

1. A cycloidal pin wheel harmonic transmission device, characterized in that, the device comprises a camshaft, a flexible bearing, a flexible wheel, roller pins and a rigid wheel, wherein:
the flexible bearing is mounted on the camshaft with an elliptical shape,
the flexible wheel has an inner ring cooperated with an outer ring of the flexible bearing, and an outer teeth surface contacted with each of the roller pins,
the roller pins are evenly disposed inside a semicircular groove of the rigid wheel, and
the flexible wheel is fixedly connected with an inner ring of a main bearing, and the rigid wheel is fixedly connected with an outer ring of the main bearing,
the flexible wheel has a teeth profile obtained by offsetting a curve equidistantly toward a center of the flexible wheel by a given distance, the curve satisfying the following equations:

$$x = E*\cos(t(Z-1)) + R*\cos(t); \text{ and}$$

$$y = E*\sin(t*(Z-1)) + R*\sin(t),$$

x and y are center coordinates of the roller pins with respect to time t using the center of the flexible wheel as a coordinate origin, E is an eccentricity of planetary motion, Z is a number of the roller pins, and R is a radius of the roller pins.

2. The cycloidal pin wheel harmonic transmission device according to claim 1, characterized in that,
the camshaft is closely fitted together with an inner ring of the flexible bearing, so as to form a wave generator; and
the inner ring of the flexible wheel is closely fitted together with the outer ring of the flexible bearing.

3. The cycloidal pin wheel harmonic transmission device according to claim 1, characterized in that,
the roller pins are circumferentially and evenly disposed inside the semicircular groove of the rigid wheel.

4. The cycloidal pin wheel harmonic transmission device according to claim 1, characterized in that,
the flexible wheel is constructed to have a cup-shape;
a bottom of the flexible wheel is designed as a through hole, and the inner ring of the main bearing is provided with a threaded hole corresponding to the through hole of the flexible wheel, so as to be fixedly connected with it by using a screw;
the rigid wheel has an outer ring provided with a threaded hole, and the outer ring of the main bearing is provided with a through hole corresponding to the threaded hole of the rigid wheel, so as to be fixedly connected with it also by using a screw; and
the main bearing is a crossed roller bearing.

5. The cycloidal pin wheel harmonic transmission device according to claim 1, wherein the given distance is the radius of the roller pins.

* * * * *